(12) United States Patent
Kayamoto (10) Patent No.: US 7,040,988 B2
(45) Date of Patent: May 9, 2006

(54) COMPRESSION ELASTIC COUPLING DEVICE

(75) Inventor: Susumu Kayamoto, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/443,971

(22) Filed: May 23, 2003

(65) Prior Publication Data

US 2004/0018880 A1    Jan. 29, 2004

(30) Foreign Application Priority Data

May 29, 2002  (JP) .............................. 2002-155192

(51) Int. Cl.
*F16D 3/68* (2006.01)
(52) U.S. Cl. .......................................... 464/17; 464/76
(58) Field of Classification Search ................... 464/17, 464/23, 66, 73, 76, 81–83
See application file for complete search history.

(56) References Cited

U.S. PATENT DOCUMENTS

| 2,025,827 | A | * | 12/1935 | Ricefield ..................... 464/76 |
| 3,257,826 | A | * | 6/1966 | Peterson .................... 464/76 X |
| 4,409,904 | A | | 10/1983 | Eichinger et al. |

FOREIGN PATENT DOCUMENTS

| DE | 1 211 872 | 3/1966 |
| DE | 2624500 | 12/1977 |
| DE | 3432436 A1 | 3/1986 |
| DE | 297 16 165 U1 | 1/1998 |
| EP | 0 937 902 A2 | 8/1999 |
| GB | 1028352 | 5/1966 |
| JP | 50-28132 | 7/1948 |
| JP | 46-21843 | 7/1971 |
| JP | A-59-6429 | 1/1984 |
| JP | 59-60088 | 4/1984 |
| JP | A-61-218832 | 9/1986 |
| JP | U-63-178281 | 11/1988 |
| JP | A-2-296013 | 12/1990 |
| JP | U-3-122 | 1/1991 |
| JP | A 7-27142 | 1/1995 |
| JP | A-2000-27883 | 1/2000 |

* cited by examiner

*Primary Examiner*—Greg Binda
(74) *Attorney, Agent, or Firm*—Oliff & Berridge, PLC (57) ABSTRACT

A compression elastic coupling device has: a drive flange fixedly mounted on an end of a drive shaft, the drive flange being provided on its surface facing a driven shaft with drive protrusions arranged at equal angular intervals; a driven flange fixedly mounted on an end of a driven shaft, the driven flange being provided on its surface facing the drive shaft with driven protrusions arranged at equal angular intervals so as to be interposed between adjacent drive protrusions of the drive flange; and power transmitting elastic members radially inserted in spaces each formed between adjacent drive and driven protrusions from a side of outer circumferences of the drive and driven flanges toward a central axis of the drive and driven shaft.

8 Claims, 9 Drawing Sheets

COMPRESSION ELASTIC COUPLING DEVICE

BACKGROUND OF THE INVENTION

1. Field of the Invention

The present invention relates to an elastic coupling device provided with elastic members capable of damping the variation of driving force of, for example, a diesel engine. More specifically, the present invention relates to a compression elastic coupling device for transmitting power by compressing elastic members interposed between input and output shafts.

2. Description of the Related Art

Conventional compression elastic coupling devices include a device A disclosed in, for example, JP-A No. 27142/1995. The device A is a dual torsional elastic coupling device provided with low-rigidity elastic members having a low torsional rigidity and arranged near the center, and high-rigidity elastic member shaving a high torsional rigidity and arranged near the periphery. Power is transmitted from a drive flange through the low-rigidity elastic members to a driven member when torque is low. Power is transmitted from the drive flange through both the low-rigidity and the high-rigidity elastic members to the driven member when load is large.

Other conventional devices B, C and D are mentioned in the specifications and drawings of German Patent Nos. 2624500, 29716165 and 3432436, respectively. Those conventional devices A, B, C and D have the following drawbacks that need improvement.

Device A: Since both the low-rigidity and the high-rigidity elastic members of the device A are not held fixedly, play of the input and the output shaft relative to each other is liable to occur due to the plastic shrinkage of the elastic members due to aging. Since the elastic members are arranged axially in a space between the drive side and the driven side, a large open space is necessary to move axially a machine on the drive side and a machine on the driven side relative to each other in order to incorporate the elastic members into the device A or replacing the elastic members. Inspection of the device A requires troublesome work and the device A is difficult to be maintained. Since the elastic members are not cooled, the elastic members are susceptible to fatigue deterioration.

Devices B and C: Elastic members interposed between an input shaft (drive shaft) and an output shaft (driven shaft) are not mechanically fixed. Therefore it is possible that play of the input shaft and the output shaft relative to each other occurs due to the plastic shrinkage of the elastic members due to aging, noise is generated by the play, and the input shaft exerts a shock load on the output shaft. The devices B and C are heavy. The elastic members cannot easily be inspected for deterioration due to aging. Since the elastic members are arranged axially in a space between the input and the output shaft, a large open space is necessary to move axially a machine on the side of the input shaft and a machine on the side of the output shaft relative to each other in order to incorporate the elastic members into the devices B and C or replacing the elastic members. Inspection of the devices B and C takes time and the devices B and C are difficult to be maintained. Since the elastic members are not cooled, the elastic members are susceptible to fatigue deterioration.

Device D: Although the direction of arrangement of elastic members between input and output shafts is not mentioned in the specification, it is inferred from the drawings that the elastic members are axially arranged. Therefore, as mentioned in connection with the devices A, B and C, a machine on the side of the input shaft and a machine on the output shaft must axially be moved relative to each other to form a large open space in replacing the elastic members. Inspection of the device D takes time and the device D is difficult to be maintained. Since the device D is not provided with any cooling mechanism for cooling the elastic members, the elastic members are susceptible to fatigue deterioration.

SUMMARY OF THE INVENTION

The present invention has been made to improve the drawbacks of conventional elastic coupling devices including the above-mentioned conventional devices and it is therefore an object of the present invention to provide a compression elastic coupling device capable of preventing formation of gaps between parts due to the aging of elastic members and the resulting noise generation, of preventing the fretting corrosion of the joining surfaces of metal parts included in elastic members, an input shaft and an output shaft, and of extending the fatigue life of the elastic members, of facilitating damping effect adjustment, having improved durability and a small weight, not requiring moving the related machines in replacing the elastic members, facilitating work for replacing the elastic members and for inspecting the elastic members for aging, and excellent in maintain ability.

According to the present invention, a compression elastic coupling device for coupling a drive shaft and a driven shaft coaxially disposed with a predetermined axial interval between ends thereof, comprises: a drive flange fixedly mounted on the end of the drive shaft, the drive flange being provided on its surface facing the driven shaft with a plurality of drive protrusions arranged at equal angular intervals; a driven flange fixedly mounted on the end of the driven shaft, the driven flange being provided on its surface facing the drive shaft with a plurality of driven protrusions arranged at equal angular intervals so as to be interposed between adjacent drive protrusions of the drive flange; and power transmitting elastic members radially inserted in spaces each formed between adjacent drive and driven protrusions from a side of outer circumferences of the drive flange and the driven flange toward a central axis of the drive shaft and the driven shaft.

In the compression elastic coupling device of the present invention, the elastic members are inserted radially inward in the spaces formed between the drive protrusions and the driven protrusions through open ends of the spaces opening in the circumferences of the drive flange and the driven flange. The elastic member can be removed from the drive flange and the driven flange by radially outwardly pulling the elastic member in replacing the deteriorated elastic member with new one. Therefore, a drive machine on the side of the drive shaft and a driven machine on the side of the driven shaft do not need to be moved to replace the elastic members. Thus, the elastic members can easily be replaced in a short time. Conditions of the elastic members, such as a condition under load and the degree of aging, can visually be recognized from the outside of the drive flange and the driven flange, and time for replacing the elastic members can simply be determined. Thus, the compression elastic coupling device is excellent in inspectability and maintainability.

Preferably, each of the elastic members has an elastic body, and substantially plate-shaped holding pads bonded to side surfaces of the elastic body, the side surfaces of the elastic body facing the drive protrusion and the driven protrusion, the holding pads being fastened to circumferential parts and radially middle parts of the drive protrusions and the driven protrusions with bolts, respectively.

In the compression elastic coupling device according to the present invention, the holding pads bonded to the elastic body by, for example, vulcanizing of the elastic member are put to the drive and driven protrusions and are fastened to the circumferential parts and radially middle parts of the drive and driven protrusions with the bolts, respectively. Therefore, any gaps are not formed between the joining surfaces of the holding pads, and those of the drive and driven protrusions in transmitting power, particularly when torque varies, even if the elastic member deteriorates, and hence any noise is not generated and fretting corrosion of the drive and driven protrusions and the holding pads can be prevented. Torsional spring constant can easily be changed by changing the thickness of the holding pads.

Preferably, the holding pad has in its radially middle part a protrusion protruding toward the elastic body.

In the compression elastic coupling device according to the present invention, the area, through which heat is transferred from the elastic body to the holding pad, is enlarged by the protrusion of the holding pad. Moreover, the radially and circumferentially middle part of the elastic body, which usually has the highest temperature in the whole of the elastic body during operation, is located closer to the holding pad in comparison to the other parts of the elastic body. Therefore, the hottest part of the elastic body can be cooled effectively by transferring heat from the elastic body to the holding pad effectively.

Moreover, the protrusion of the holding pad serves as a load limiter to protect the elastic member from excessive compressive load since the protrusion of the holding pad will prevent the pair of the holding pads from being excessively close to each other.

Preferably, a cylindrical cover is fastened to either the drive flange or the drive protrusions or both the drive flange and the drive protrusions, or either the driven flange or the driven protrusions or both the driven flange and the driven protrusions.

The cylindrical cover serves as a reinforcement and distributes load to the protrusions. Therefore, the protrusions may be small and lightweight and hence the compression elastic coupling device has a small weight.

Preferably, at least either the drive flange or the driven flange is provided with cooling air inlets at positions near the elastic members, and the elastic members and the cylindrical cover are provided with a plurality of cooling air passages.

While the compression elastic coupling device is in operation, air flows around the elastic members and through the cooling air passages to cool the elastic members from inside and from outside the elastic members. Consequently, the fatigue life of the elastic members is extended, and the elastic members are able to retain their original functional property for a long time and to function stably for a long period of use.

Preferably, the elastic body of the elastic member is formed of a natural rubber, a synthetic rubber or a soft resin.

Thus, the compression elastic coupling device of the present invention is applicable to multiple uses.

Preferably, each of the elastic members is disposed in one of a pair of spaces on opposite sides of each drive protrusion, and a spring mechanism is disposed in other of the pair of spaces.

A ship provided with a diesel engine does not stop immediately after the diesel engine has been stopped and the propeller shaft of the ship is kept rotating by inertial force. Consequently, power is transmitted from the driven shaft to the drive shaft, the reverse torque acts on the elastic coupling device, and tensile force acts on the elastic members. When the elastic member and the spring mechanism are disposed in the spaces on the opposite sides of the drive protrusion, respectively, the spring mechanism resists the contraction of the space between the drive protrusion and the driven protrusion to prevent the extension of the elastic member by tensile force.

Preferably, some of the elastic members are damping devices having a damping function. For example three elastic members among six elastic members may be damping devices, such as hydraulic dampers or laminated springs.

The use of the damping devices instead of the elastic members enhances the damping effect of the compression elastic coupling device.

Preferably, the elastic member is disposed in a space on one side of the drive protrusion. The device further comprises a gap measuring device for measuring a gap between a surface of the drive protrusion facing a space on other side of the drive protrusion and a surface of adjacent driven protrusion facing the space on other side of the drive protrusion to determine a permanent deformation of the elastic body of the elastic member.

When the elastic body of the elastic member deforms (shrinks) gradually plastically due to aging, the width of the space on the other side of the drive protrusion increases gradually. Therefore, the permanent deformation of the elastic body of the elastic member can be determined through the measurement of the width of the space. Since the elastic member is disposed only in the space on one side of the drive protrusion for power transmission, the compression elastic coupling device has a small weight. Even if an excessive tensile load is produced, for example, in starting the engine, in stopping the engine and the changing operating speed passes a resonant point, the rear surfaces of the drive and driven protrusions serve as a load limiter to limit the tensile load below a permissible limit.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
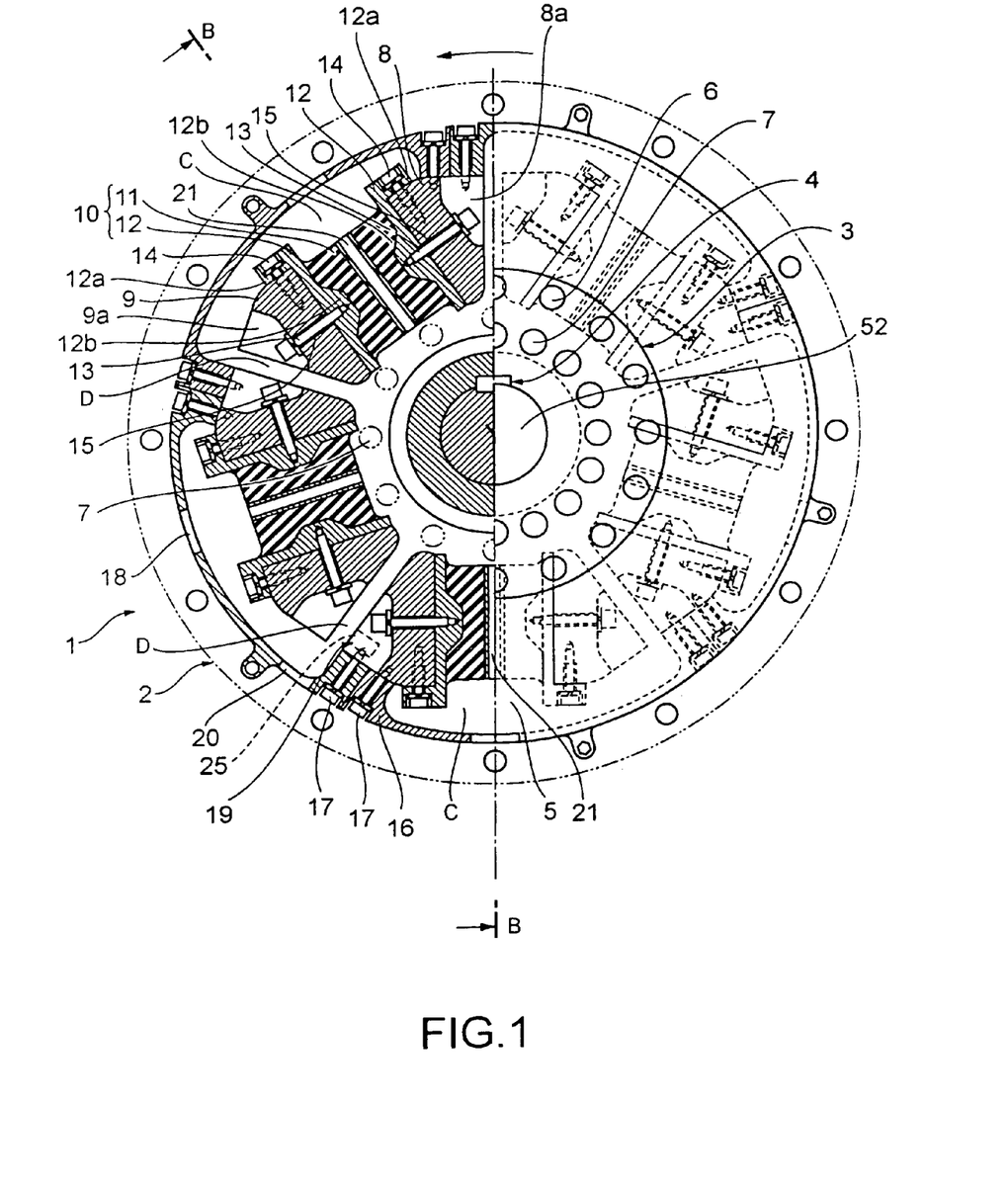
FIG. 1 is a partly cutaway front elevation of a compression elastic coupling device in a first embodiment according to the present invention as applied to couple a drive shaft on the side of a diesel engine and a driven shaft.
Figure 2:
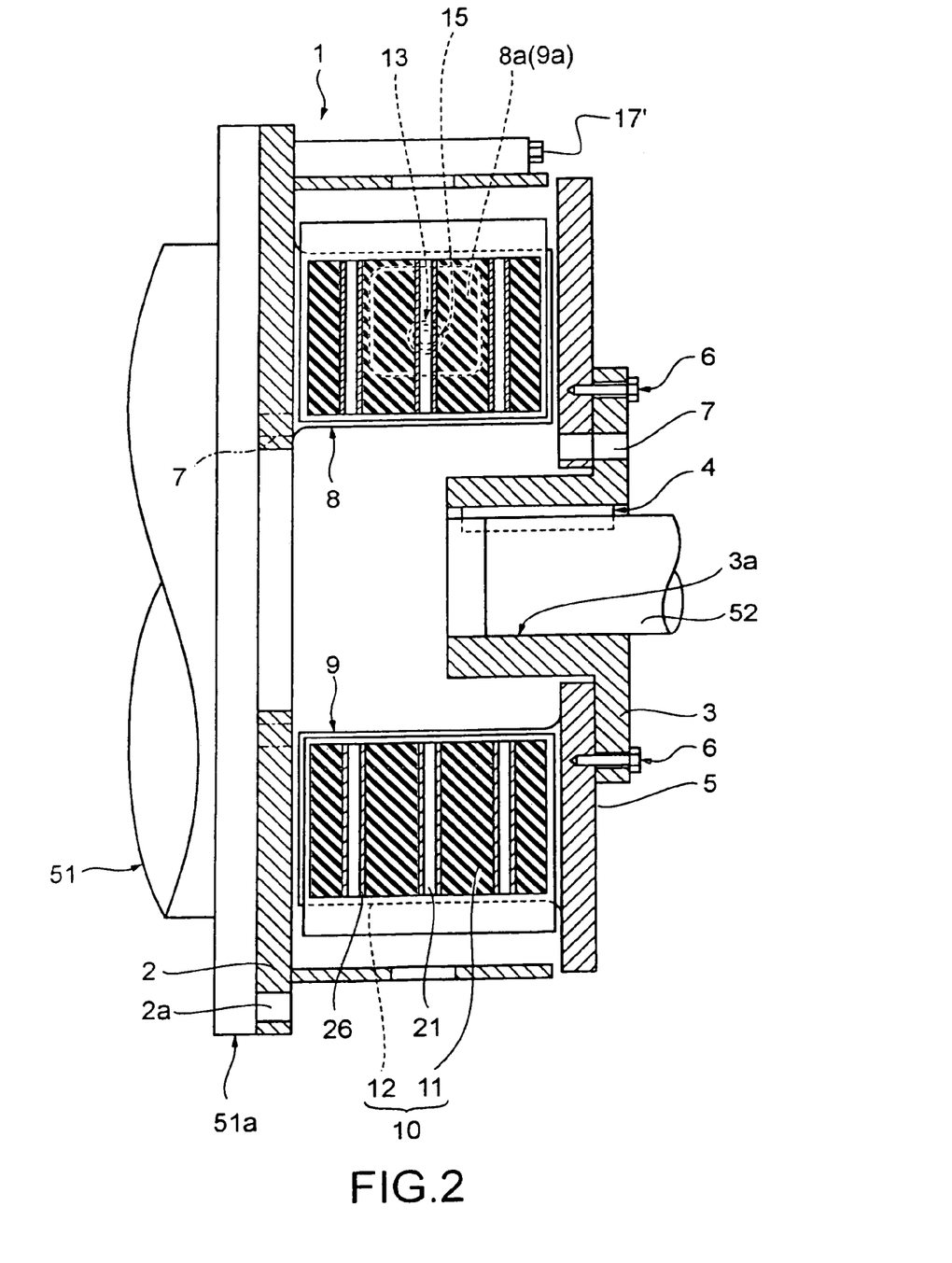
FIG. 2 is a sectional view taken on the line B—B in FIG. 1.

Referring to FIGS. 1 and 2, a compression elastic coupling device 1 in the first embodiment is interposed between a drive shaft 51 and a driven shaft 52. A flange 51a is formed integrally with an end of the drive shaft 51. A drive flange 2 is fastened to the flange 51 with a plurality of bolts 2a arranged at equal angular intervals. The driven shaft 52 is spaced a predetermined distance from the end of the drive shaft 51 and is supported for rotation coaxially with the drive shaft 51. And end part of the driven shaft 52 is fitted in a central bore 3a formed in a small flange 3, and the flange 3 and the driven shaft 52 are interlocked by a key 4. The flange 3 and the driven shaft 52 rotate together. A large driven flange 5 is fastened to the inner surface, i.e., a surface facing the drive shaft 51, of the small flange 3 with a plurality of bolts 6. A plurality of cooling air inlets 7 are formed through central parts of the flanges 3 and 5.

As shown in FIGS. 1 and 2 with the imaginary lines, cooling air inlet 7'may be provided in the drive flange 2 in addition to the inlet air hole 7 in the flange 3, or instead of the inlet air hole 7 in the flange 3. The drive shaft 51 may be formed with a tubular member so that air can flow into the cooling air inlets 7'via the inside of the tubular member. The cooling air inlets 7, 7'are disposed at positions near the elastic members 10.

A plurality of drive protrusions 8 (five drive protrusions 8 in this embodiment) having a substantially triangular cross section protrude from the drive flange 2 toward the driven flange 5. A plurality of driven protrusions 9 (five driven protrusions 9 in this embodiment) having a substantially triangular cross section protrude from the driven flange 5 toward the drive flange 2. The drive protrusions 8 are arranged at equal angular intervals on the inner surface of the drive flange 2. The driven protrusions 9 are arranged at equal angular intervals on the inner surface of the driven flange 5. When the drive flange 2 and the driven flange 5 are set in place, the drive protrusions 8 and the driven protrusions 9 are arranged circumferentially alternately. Each of the drive protrusions 8 and the driven protrusion 9 on one side of the drive protrusion 8 constitute a power transmitting pair. A wide space C is formed between the drive protrusion 8 and the driven protrusion 9 of each power transmitting pair, and a narrow space D is formed between the driven protrusion 9 of the power transmitting pair and the drive protrusion 8 of the adjacent power transmitting pair.

An elastic member 10 is inserted in the space C between the drive protrusion 8 and the driven protrusion 9 of each power transmitting pair. The elastic member 10 has an elastic body 11 formed of natural rubber and having a shape resembling a rectangular parallelepiped, and a pair of substantially plate-shaped holding pads 12 attached to the opposite side surfaces of the elastic body 11, respectively. Each holding pad 12 has a circumferentially extended joining part 12a provided with a hole for receiving a bolt. The holding pad 12 has in its radially middle part a protrusion 12b provided with a threaded hole. A fastening screw 13 is screwed in the threaded hole of the protrusion 12b. The elastic body 11 and the pair of holding pads 12 are bonded together by vulcanizing. The elastic member 10 is radially inserted toward the central axis of the drive/driven shafts 51, 52 in the space C between the drive protrusion 8 and the driven protrusion 9 of each power transmitting pair, and bolts 14 are screwed through the holes of the joining parts 12a of the holding pads 12 in threaded holes formed in the outer surfaces of the circumferential parts of the protrusions 8 and 9 to fasten the holding pads 12 to the protrusions 8 and 9. Recesses 8a and 9a are formed in middle parts of the side surfaces, respectively facing the spaces D, of the drive protrusion 8 and the driven protrusion 9, respectively. Holes 15, opening into the recesses 8a and 9a, for receiving the fastening screws 13 are formed in the drive protrusion 8 and the driven protrusion 9 so as to extend perpendicularly to the holding pads 12. The fastening screws 13 are screwed through the openings 15 in the threaded holes formed in the protrusions 12b of the holding pads 12 to fasten the holding pads 12 to the inner surfaces of the radially middle parts of the protrusions 8 and 9, respectively.

In the first embodiment, a gap-measuring device 25 is placed in a gap-measuring hole 19 formed in a radially outer part of the side surface, facing one of the narrow spaces D, of the drive protrusion 8.

The gap-measuring device 25 is configured to measure a gap between the surface of the drive protrusion 8 facing the space D and the surface of the adjacent driven protrusion 9 facing the same space D to determine a permanent deformation of the elastic body 11 of the elastic member 10. The gap-measuring device 25 may be constituted by a known gap-measuring device, such as a non-contact type displacement detector. The capacitance-type displacement detector. The capacitance-type displacement detector may be disposed on the drive protrusion 8 so that the detecting surface of the detector is opposite to the surface of the adjacent driven protrusion 9.

Each elastic body 11 is provided with a plurality of cooling air holes 21 arranged at axial intervals, and metal tubes-tubes 26 are fitted in the cooling air holes 21, respectively.

Figure 6A:
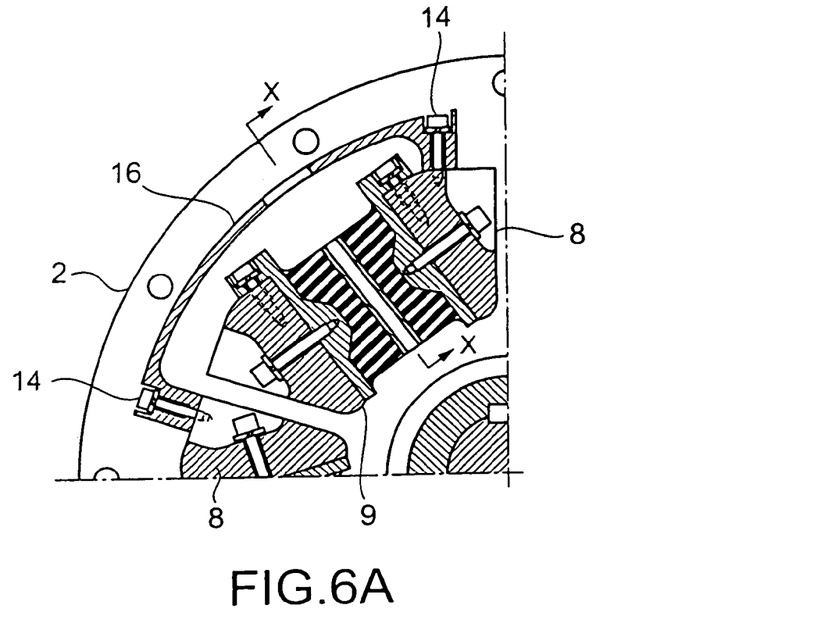
FIG. 6A is a fragmentary front elevation of a modified compression elastic coupling device according to the present invention.
Figure 6B:
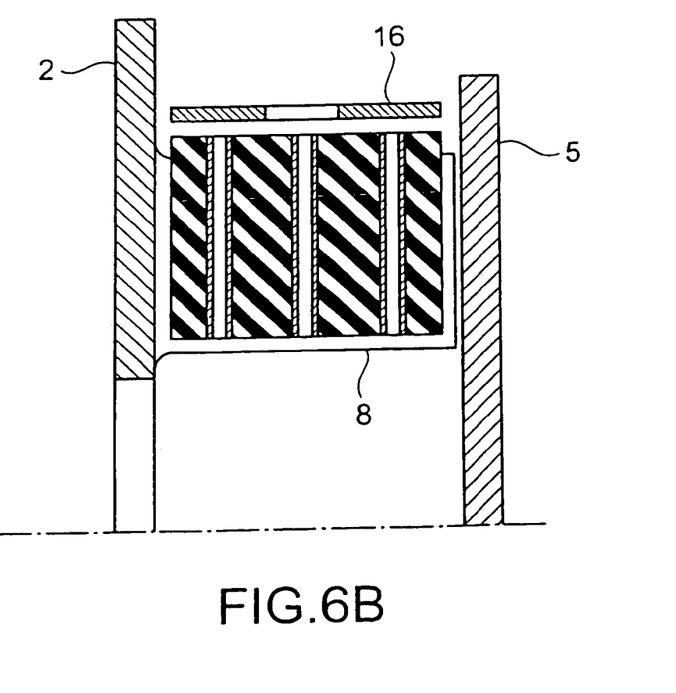
FIG. 6B is a sectional view taken on the line X—X in FIG. 6A.
Figure 7A:
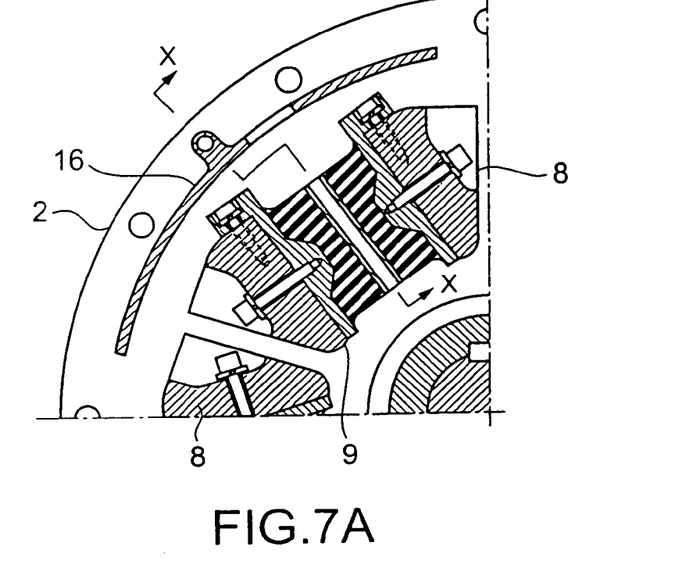
FIG. 7A is a fragmentary front elevation of a second modified compression elastic coupling device according to the present invention.
Figure 7B:
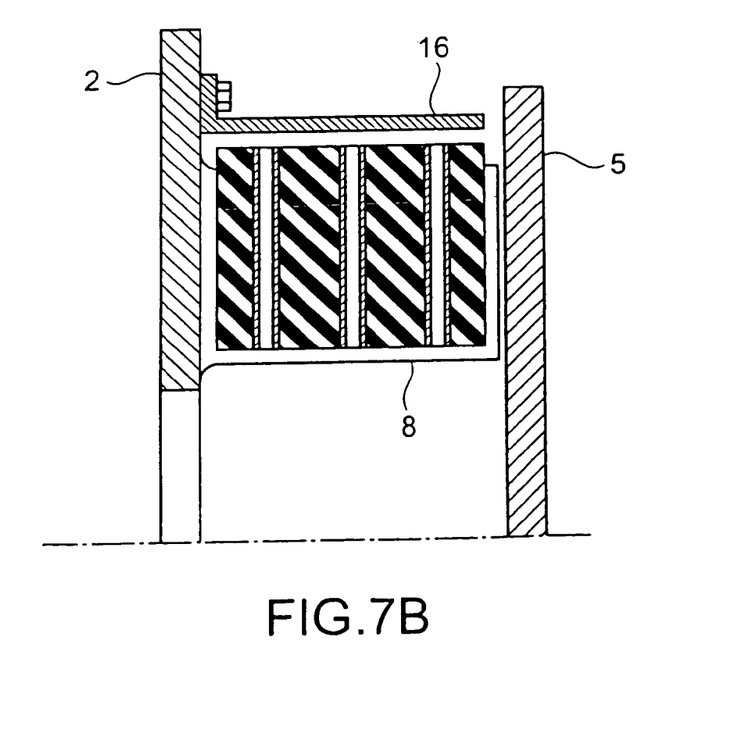
FIG. 7B is a sectional view taken on the line X—X in FIG. 7A.
Figure 8A:
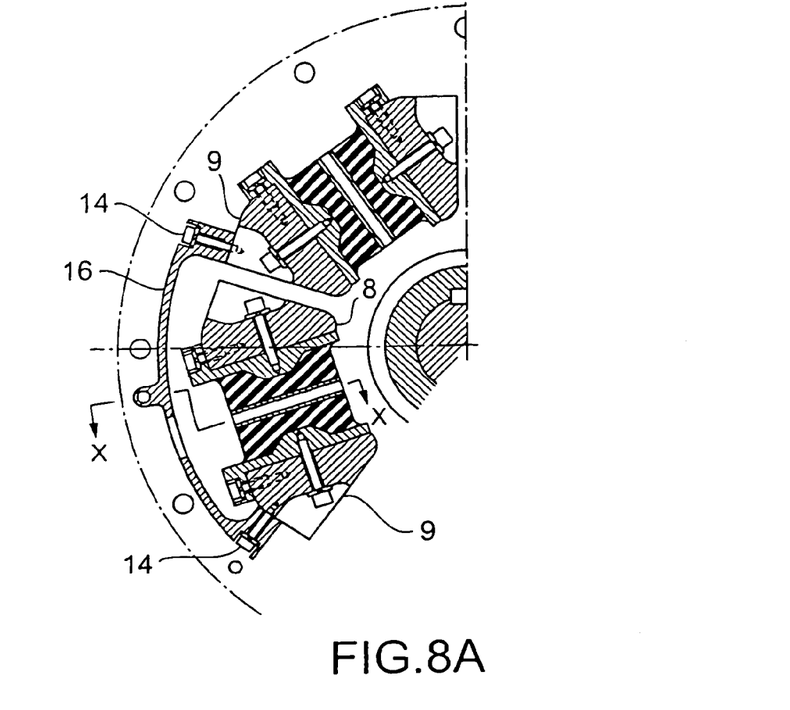
FIG. 8A is a fragmentary front elevation of a third modified compression elastic coupling device according to the present invention.
Figure 8B:
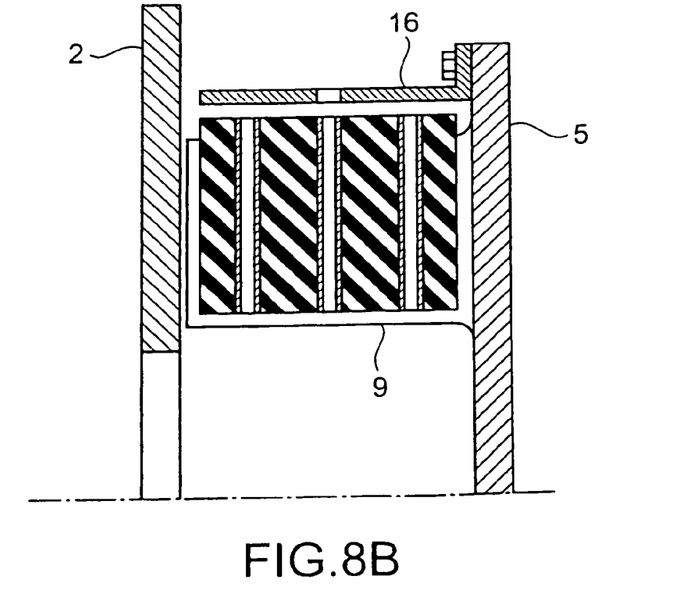
FIG. 8B is a sectional view taken on the line X—X in FIG. 8A.
Figure 9A:
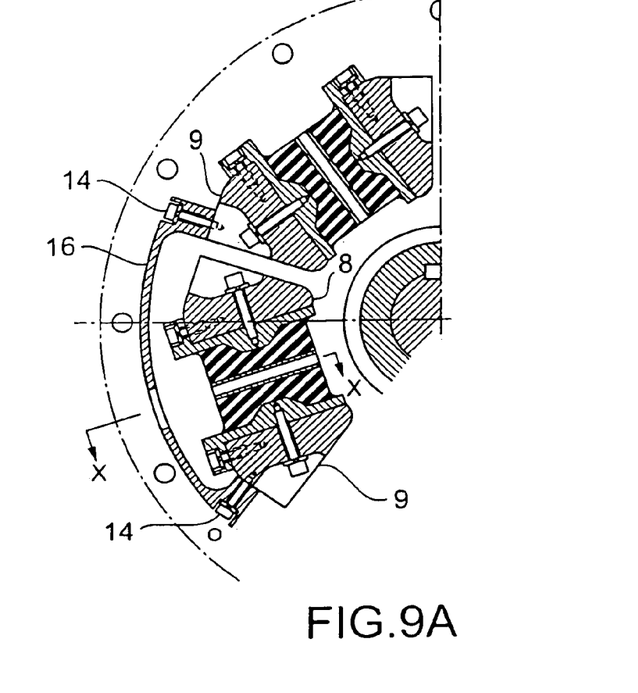
FIG. 9A is a fragmentary front elevation of a fourth modified compression elastic coupling device according to the present invention.
Figure 9B:
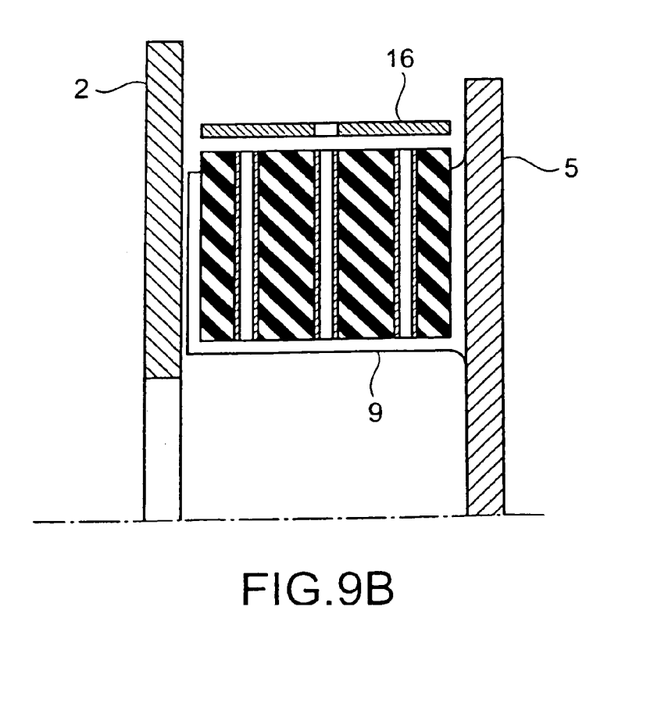
FIG. 9B is a sectional view taken on the line X—X in FIG. 9A.
Figure 10A:
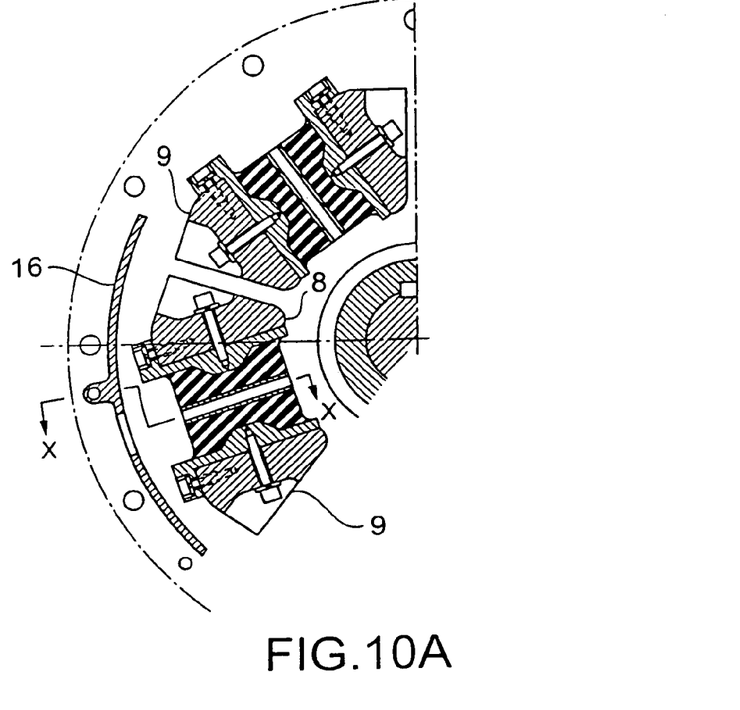
FIG. 10A is a fragmentary front elevation of a fifth modified compression elastic coupling device according to the present invention.
Figure 10B:
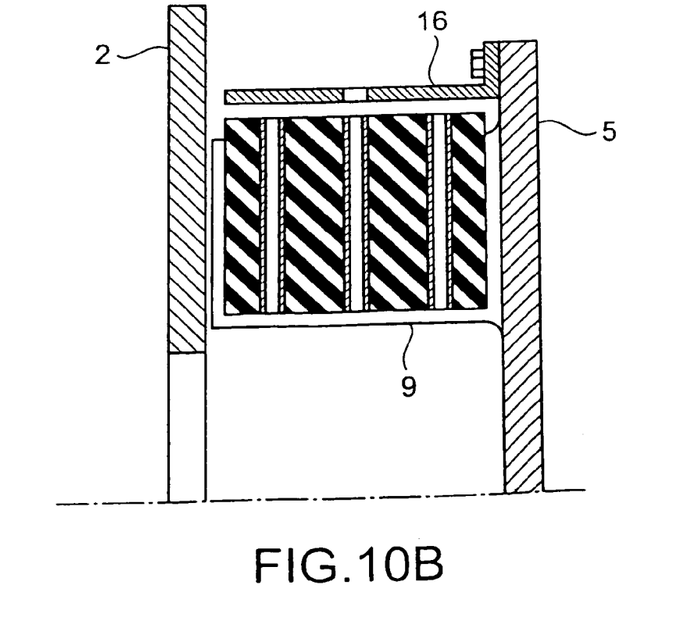
FIG. 10B is a sectional view taken on the line X—X in FIG. 10A.

A cylindrical cover is divided circumferentially equally into five sections 16. The five sections 16 of the cylindrical cover are fastened to the outer surfaces of the drive protrusions 8 with bolts 17 and to the drive flange 2 by bolts 17'. Of course, the sections 16 can be fastened to the drive protrusions 8 (FIGS. 6A and 6B), the drive flange 2 (FIGS. 7A and 7B). both the driven flange 5 and the driven protrusions 9 (FIGS. 8A and 8B), the driven protrusions 9 (FIGS. 9A and 9B) or the driven flange 5 (FIGS. 10A and 10B), Cooling air outlets 18 are formed in a substantially circumferentially middle part of each of the sections 16 so as to correspond, respectively, to the cooling air holes 21. A gap-measuring hole 20 is formed in the section 16 so as to correspond to the gap-measuring device 25.

The operation of the compression elastic coupling device 1 thus constructed will be described.

Referring to FIG. 1, the drive flange 2 provided with the drive protrusions 8 starts rotating in a counterclockwise direction indicated by the arrow in FIG. 1 when the diesel engine, i.e., a driving device, is started. Then, the elastic bodies 11 of the elastic members 10 are compressed and torque is transmitted from the drive protrusions 8 to the driven protrusions 9. Consequently, the small flange 3, the driven flange 5 and the driven shaft 52 rotate.

In this state, air flows through the cooling air inlets 7 into the space between the flanges 2 and 5, flows through the air holes 21 of the elastic bodies 11, and flows outside through the cooling air outlets 18 of the sections 16 of the cylindrical cover. Thus, the elastic bodies 11 are cooled continuously while the compression elastic coupling device 1 is in operation, which is effective in retarding the fatigue deterioration of the elastic bodies 11. The elastic bodies 11 have a tendency to be deteriorated by aging and to shrink. However, since the pair of holding pads 12 are firmly bonded to the opposite side surfaces of the elastic body 11 by vulcanizing, and the holding pads 12 are fastened to the protrusions 8 and 9 with the bolts and the fastening screws 13, the elastic body 11 does not separate from the holding pads 12, and the joining surfaces of the holding pads 12 and the protrusions 8 and 9 are not subject to fretting corrosion.

The width of the space D between the protrusions 8 and 9 increases as the width of the space C between the protrusions 8 and 9 of each power transmitting pair decreases due to the shrinkage of the elastic body 11 with time. The increase of the width of the space D is measured by the gap measuring device 25 and can be recognized through the visual observation of the elastic body 11 through the gap measuring hole 20.

Figure 3:
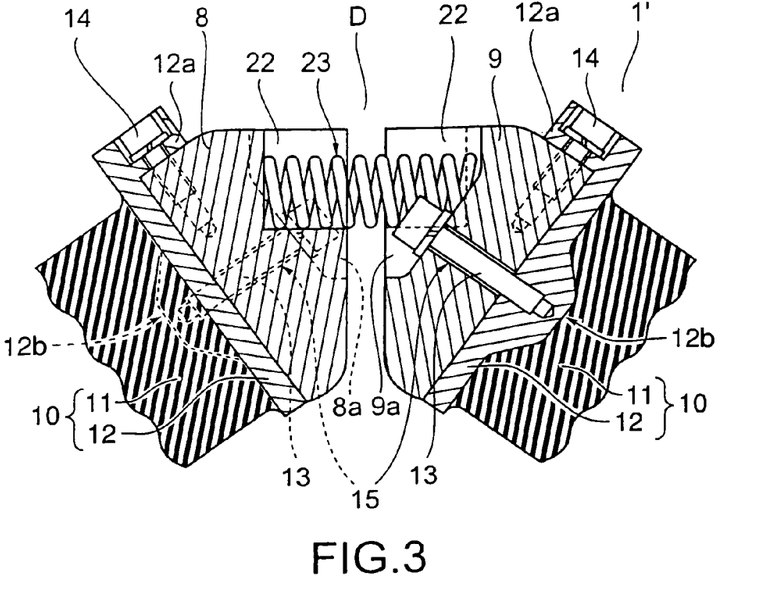
FIG. 3 is a fragmentary sectional view, corresponding to FIG. 1, of a compression elastic coupling device in a second embodiment according to the present invention.

A compression elastic coupling device 1' in a second embodiment according to the present invention will be described with reference to FIGS. 3 and 4. The compression elastic coupling device 1' in the second embodiment is substantially identical with the compression elastic coupling device 1 in the first embodiment and hence only particulars relating to the second embodiment and different from those relating to the first embodiment will be described. FIG. 3 is a fragmentary sectional view, corresponding to FIG. 1, of the compression elastic coupling device 1' in the second embodiment and FIG. 4 is a fragmentary sectional view, corresponding to FIG. 2, of the compression elastic coupling device 1', in which parts like or corresponding to those shown in FIGS. 1 and 2 are denoted by the same reference characters and the description thereof will be omitted.

Figure 4:
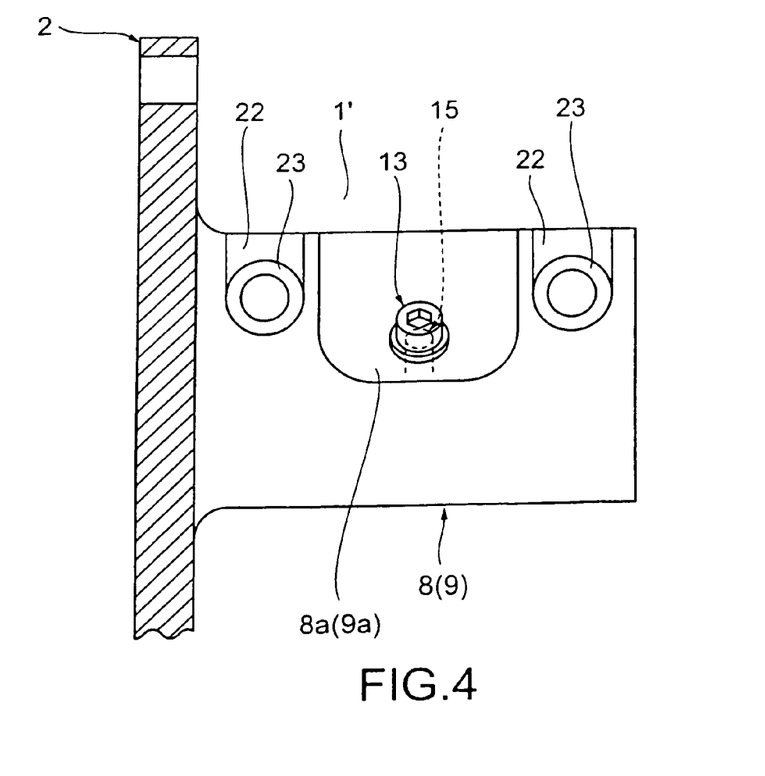
FIG. 4 is a fragmentary sectional view, corresponding to FIG. 2, of the compression elastic coupling device shown in FIG. 3.

Referring to FIGS. 3 and 4, recesses 8a and 9a are formed in side surfaces, facing a space D, of drive protrusion 8 and a driven protrusion, respectively. As best shown in FIG. 4, spring holding grooves 22 having a U-shaped cross section are formed on the axially opposite sides of the recesses 8a and 9a of the drive protrusion 8 and the driven protrusion 9, respectively. As best shown in FIG. 3, compression coil springs 23 are placed in the spring holding grooves 22 so as to extend across the space D and to be compressed between the drive protrusion 8 and the driven protrusion 9.

In the compression elastic coupling device 1', the compression coil springs 23 are extended in all the spaces D and the elastic members 10 are placed in the spaces C. Therefore, the distances between the adjacent protrusions 8 and 9 are unable to change easily and remain constant. Supposing that the diesel engine is installed in a ship, the ship does not stop immediately after the diesel engine has been stopped and the propeller shaft of the ship is kept rotating by inertial force. Consequently, power is transmitted from the driven shaft 52 to the drive shaft 51, and the reverse torque tending to rotate the compression elastic coupling device 1' in a clockwise direction, i.e., a direction opposite a direction indicated by the arrow in FIG. 1, acts on the compression elastic coupling device 1', and tensile force acts instead of compressive force on the elastic bodies 11. Since the compressed compression coil springs 23 extended in the spaces D resist the contraction of the space D between the drive protrusion 8 and the driven protrusion 9, the extension of the elastic bodies 11 can be prevented and the service life of the elastic bodies 11 is extended.

Figure 5:
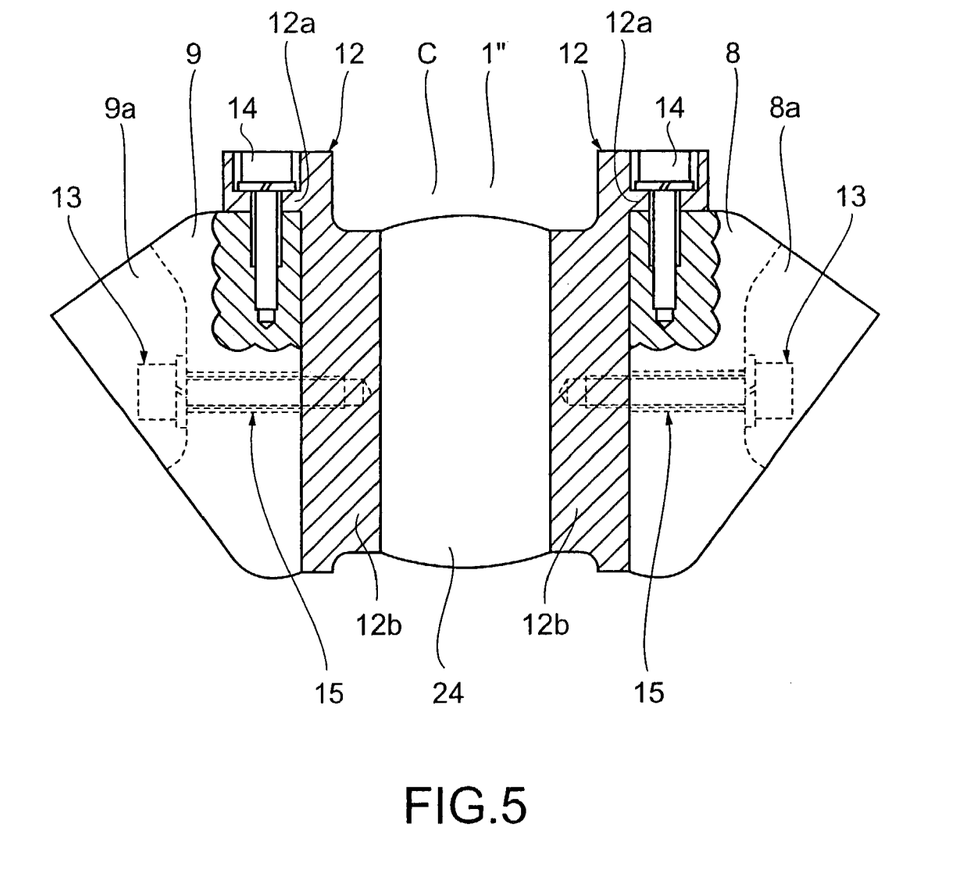
FIG. 5 is fragmentary sectional view of a compression elastic coupling device in a third embodiment according to the present invention.

An essential part of a compression elastic coupling device 1" in a third embodiment according to the present invention is shown in FIG. 5 in a sectional view. The compression elastic coupling device 1" in the third embodiment is substantially identical with the compression elastic coupling devices in the first and the second embodiment, and hence parts like or corresponding to those shown in FIGS. 1 to 4 are denoted by the same reference characters and the description thereof will be omitted.

Referring to FIG. 5, the compression elastic coupling device 1" is provided with six power transmitting pairs each of a drive protrusion 8 and a driven protrusion 9 defining a space C. Thus, the compression elastic coupling device 1" has six spaces C. Three elastic members 10, and three hydraulic dampers 24 or laminated springs, not shown, i.e., damping devices, are placed alternately in the six spaces C.

The alternate arrangement of the elastic members 10 and the hydraulic dampers 24 having a damping function gives the compression elastic coupling device an enhanced damping capacity. Thus, the compression elastic coupling device 1" is capable of smoothly absorbing the variation of the torque of the diesel engine and of smoothly transmitting power from the drive shaft 51 to the driven shaft 52.

Although the invention has been described in its three embodiments, the present invention is not limited thereto in its practical application and various changes and modifications including the followings are possible.

(1) The cylindrical cover including the sections 16 fastened to the drive protrusions 8 may be omitted-to simplify the construction of the compression elastic coupling device and to enhance the effect of cooling the elastic bodies. The sections 16 of the cylindrical cover may be fastened to the driven protrusions 9 or may be fastened to the drive flange 2 and the drive protrusions 8.

(2) The elastic bodies 11 may be formed of any suitable material, such as a synthetic rubber or a soft resin.

(3) The compression elastic coupling device of the present invention is applicable not only to a transmission system for transmitting power of the diesel engine to the propeller of a ship, but also to those for transmitting power of generators and construction machines.

(4) The area, through which heat is transferred from the elastic body 11 to the holding pads 12, is enlarged by the protrusions 12b of the holding pads 12. Moreover, the radially and circumferentially middle part of the elastic body 11, which usually has the highest temperature in the whole of the elastic body 11 during operation, is located closer to the holding pads 12 in comparison to the other parts of the elastic body 11. Therefore, the hottest part of the elastic body 11 can be cooled effectively by transferring heat from the elastic body 11 to the holding pads 12 effectively.

(5) The protrusions 12b of the holding pads 12 serve as load limiters to protect the elastic members 10 from excessive compressive loads since the protrusions 12b of the holding pads 12 will prevent the pair of the holding pads 12 from being excessively close to each other.

Although the invention has been described in its preferred embodiments with a certain degree of particularity, obviously various changes and variations are possible therein. It is therefore to be understood that the present invention may be practiced otherwise than as specifically described herein without departing from the scope and spirit thereof.

What is claimed is:

1. A compression elastic coupling device for coupling a drive shaft and a driven shaft coaxially disposed with a predetermined axial interval between ends thereof, comprising:
    a drive flange capable of being fixedly mounted on an end of the drive shaft, the drive flange being provided, on a surface facing the driven shaft, with a plurality of drive protrusions arranged at equal angular intervals;
    a driven flange capable of being fixedly mounted on an end of the driven shaft, the driven flange being provided, on a surface facing the drive shaft, with a plurality of driven protrusions arranged at equal angular intervals so as to be interposed between adjacent drive protrusions of the drive flange; and
    power transmitting elastic members radially inserted in spaces between adjacent drive and driven protrusions and from outer circumferences of the drive flange and the driven flange toward a central axis of the drive shaft and the driven shaft, wherein:
    each of the elastic members has an elastic body and a pair of substantially plate-shaped holding pads bonded to side surfaces of the elastic body,
    the side surfaces of the elastic body face the drive protrusion and the driven protrusion, respectively,
    one of the pair of holding pads is fastened to the drive protrusion at both an outer circumferential part of the holding pad with a radially extending bolt and a radially middle part of the holding pad with a circumferentially extending bolt, and
    another of the pair of holding pads being fastened to the driven protrusion at both an outer circumferential part of the holding pad with a radially extending bolt and a radially middle part of the holding pad with a circumferentially extending bolt.

2. The compression elastic coupling device according to claim 1, wherein at least one of the holding pads has, in the radially middle part, a protrusion protruding toward the elastic body.

3. The compression elastic coupling device according to claim 1, wherein a cylindrical cover is fastened to either the drive flange or the drive protrusions or both the drive flange and the drive protrusions, or either the driven flange or the driven protrusions or both the driven flange and the driven protrusions.

4. The compression elastic coupling device according to claim 3, wherein at least either the drive flange or the driven flange is provided with cooling air inlets, and the elastic members and the cylindrical cover are provided with a plurality of cooling air passages.

5. The compression elastic coupling device according to claim 1, wherein the elastic body of each elastic member is formed of a natural rubber, a synthetic rubber or a soft resin.

6. The compression elastic coupling device according to claim 1, wherein each of the elastic members is disposed in one of a pair of spaces on opposite sides of each drive protrusion, and a spring mechanism is disposed in other of the pair of spaces.

7. The compression elastic coupling device according to claim 1, wherein some of the elastic members are damping devices having a damping function.

8. The compression elastic coupling device according to claim 1, wherein the elastic member is disposed in a space on one side of the drive protrusions, and
    wherein the device further comprises a gap measuring device for measuring a gap between a surface of a drive protrusion facing a space on the other side of the drive protrusion and a surface of an adjacent driven protrusion facing the space on the other side of the drive protrusion to determine a permanent deformation of an elastic body of one of the elastic members.

* * * * *